United States Patent [19]

Kurtgis

[11] Patent Number: 4,673,059
[45] Date of Patent: Jun. 16, 1987

[54] PLACEMENT OF LOAD ONTO ENERGIZED TRANSMISSION LINE SYSTEM

[76] Inventor: Michael P. Kurtgis, 2301 Pecan Ct., Pembroke Pines, Fla. 33026

[21] Appl. No.: 699,493

[22] Filed: Feb. 8, 1985

Related U.S. Application Data

[63] Continuation of Ser. No. 456,720, Dec. 20, 1982, abandoned.

[51] Int. Cl.$^4$ .............................................. A62B 1/06
[52] U.S. Cl. ...................................... 182/3; 182/142; 182/150
[58] Field of Search ................. 182/150, 142, 206, 3, 182/7, 145; 59/90; 244/137 P, 137 R

[56] References Cited

U.S. PATENT DOCUMENTS

| | | | |
|---|---|---|---|
| 1,036,482 | 8/1912 | Fredeen | 182/150 |
| 2,070,580 | 2/1937 | Cochran | 182/7 |
| 2,626,447 | 1/1953 | Hunt | 182/150 |
| 2,700,781 | 2/1955 | Smith | 244/137 P |
| 2,953,330 | 9/1960 | Lysak | 244/137 R |
| 2,966,878 | 1/1961 | Ferser | 59/90 |
| 3,176,795 | 4/1965 | Taylor | 182/145 |
| 3,863,736 | 2/1975 | McWilliams | 182/142 |
| 4,243,118 | 1/1981 | Landry | 182/3 |
| 4,422,528 | 12/1983 | Patterson | 182/150 |

FOREIGN PATENT DOCUMENTS

| | | | |
|---|---|---|---|
| 975405 | 9/1975 | Canada | 182/150 |

Primary Examiner—Reinaldo P. Machado
Assistant Examiner—Alvin Chin-Shue
Attorney, Agent, or Firm—Malin, Haley & McHale

[57] ABSTRACT

A method and system for placing a load, which may consist of a combination of personnel, equipment and material, on or in proximity to components of an energized transmission line system. An ungrounded, overhead, aerial support means, such as a helicopter or crane, provides maneuverable support to a suspension means having dielectric strength or insulating means to minimize injurious fault current flow resulting from contact between energized and grounded components of the placement system and transmission line system. The system of ungrounded and insulated support permits contact between differing but ungrounded potentials to permit live line and barehand procedures in servicing, repairing, maintaining and constructing energized transmission line systems. A limited slip device may be used with the suspension means to provide additional length to the suspension means during movement of the supporting means, such as a helicopter, while it may be momentarily tethered to the transmission line system. A specialized retaining means may be utilized to attach the load to the suspension means. This system permits contact with an energized component thereby changing the potential of the system to that of the energized component without fault current flow. Insulated links may be used in the suspension means to maintain the integrity of the ungrounded system.

18 Claims, 5 Drawing Figures

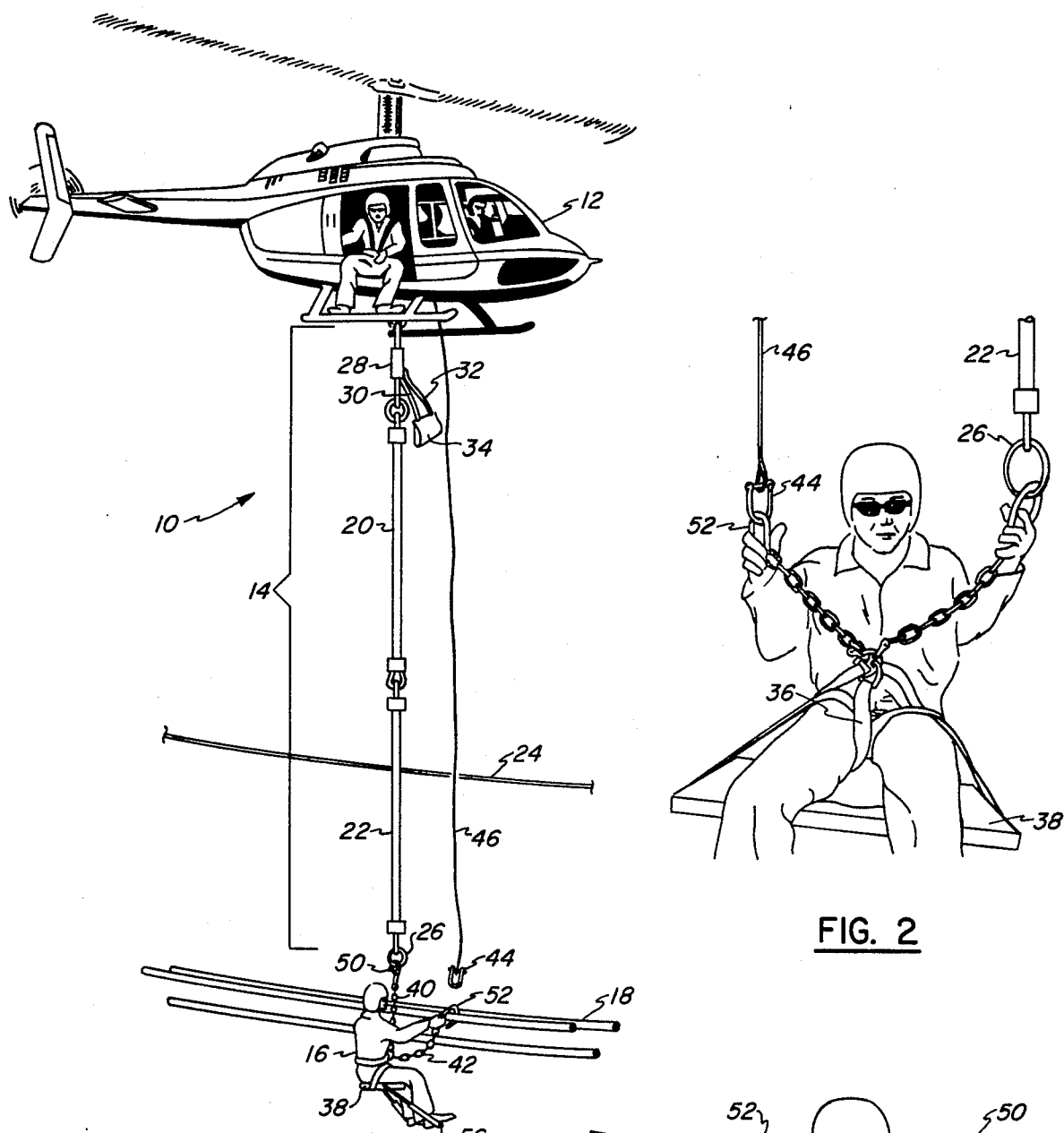
FIG. 1
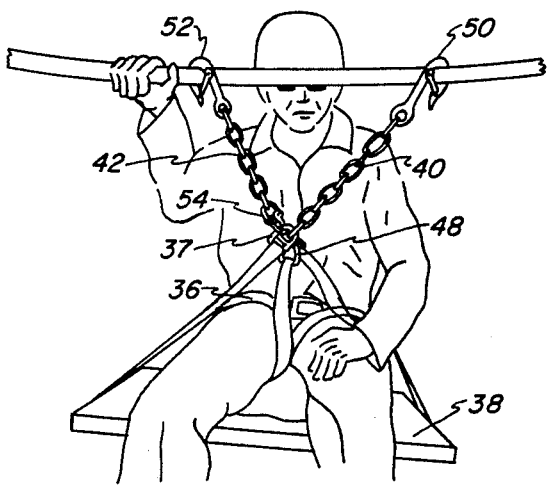
FIG. 2
FIG. 3

PLACEMENT OF LOAD ONTO ENERGIZED TRANSMISSION LINE SYSTEM

This application is a continuation of application Ser. No. 456,720, filed Dec. 20, 1982, now abandoned.

BACKGROUND OF THE INVENTION

This invention relates to a new and improved method and system for placing personnel, equipment, and material onto or in proximity to components of an energized electric transmission line system utilizing a generally ungrounded, aerial, overhead support platform and a suspension means composed of combinations of cable, nylon line and/or insulated components. In the electrical power generating utility industry, the servicing, repairing, maintaining, and construction of the transmission line system is done in either an energized state or de-energized state. The preferred method is in the energized state so that revenues are not lost. The electrical utility companies basically utilize either the live line or barehand technique when operating with an energized transmission line system to avoid damage or injury resulting from the flow of fault current.

Electricity is conveyed over long distances on conductors suspended by support structures that may be in excess of seventy-five (75) feet, such as metal lattice towers. Not only is access to the structures difficult and dangerous, but the presence of bundled energized conductors in three phases increases the danger of injury or damage from fault current discharge (arcing). Insulated components of the towers provide stand-off air gap distances between the high voltage conductors and the tower structure which is grounded. This air gap distance is required to prevent the charge on the conductor from arcing to the grounded support structure over the distance provided by the insulated component. This occurrence is referred to as a flash-over or arcing.

Certain arcing may be a relatively harmless discharge or transfer, such as between two differing ungrounded potentials, to equalize the potential. If the potentials are not grounded, there is no fault current. This discharge between ungrounded differing potentials will generally not occur unless they are very close together, usually a matter of inches. These types of discharges are generally not hazardous to personnel or ungrounded structures since minimal current flow occurs. This is the general principle behind barehand and live line maintenance techniques in use by the electrical utility industry today.

The more serious and lethal discharge is the fault discharge between differing potentials, one of which is grounded. The fact that one potential is grounded creates a greater stress on the insulating medium, whether it be the insulating component or an air gap, to convey the charge of the conductor to the grounded object. In order to prevent this type of flash-over, a greater distance must be maintained from the grounded differing potential, such as from the power line to any structure or object, whether it be a man, vehicle or the tower that is grounded. These distances have been determined and are utilized in the electrical utility industry as a standard stand-off distance in working with high power electrical lines. Typical values promulgated by OSHA and relied upon by the utilities industry are:

2.1–15 kv: 2'0"
15.1–35 kv: 2'4"
46.1–72.5 kv: 3'0" (high voltage)
72.6–121 kv: 3'4" (high voltage)
138–145 kv: 3'6" (high voltage)
230–242 kv: 5' (high voltage)
500–552 kv: 11' (extra high voltage)
700–765 kv: 15' (extra high voltage)

As a grounded object approaches the energized component within a distance less than the flash-over stand-off values set forth above, the probability of a fault discharge or arcing to ground increases proportionately. The flash-over stand-off values set forth above have incorporated in them a certain safety factor and therefore adherence to them will generally insure that such a fault discharge will not occur. However, venturing inside those values will increase the potential for the fault discharge.

In live line procedures the repair, maintenance, inspection, and service of a transmission line system have been accomplished by ground crews utilizing apparatus mounted on generally ungrounded booms which are extended up to the structures or by men mounted on generally ungrounded bucket trucks and raised to the vicinity of the structures, and utilizing insulated apparatus to perform their functions. These methods are not only awkward but are only successful on those structures which may be reached by the available equipment. The greatest danger and obstacle arising in the utilization of these procedures is the fact that the booms and bucket trucks may become inadvertently grounded by structural deficiencies or failure of personnel to strictly adhere to safety procedures, and therefore the personnel operating them must adhere to the flash-over stand-off values set forth above when operating around energized structures. Utility companies have experienced fault flash-over as a result of ground crews inadvertently touching an energized component of the transmission line or allowing a grounded object to be positioned adjacent to an energized component within the stand-off value. If a fault flash-over occurs, a short circuit may result shutting down the entire power line and damaging the components of the power line requiring extensive repairs.

Regarding very tall structures, it is necessary that the maintenance personnel climb the structure to position themselves for repairs. Equipment and material must then be raised to them from the ground and again introduces the risk of a fault current discharge. Carts and other similiar pieces of equipment have been used to traverse the conductors, but transfer past support structures such as tower arms have proven difficult and time-consuming and raises the risk of a fault discharge from contact between energized and grounded objects. Inherent throughout these procedures is the danger of men moving about on the high structure in the vicinity of energized conductors.

As a result of the shut down from fault flash-overs, utility companies have experienced losses of revenues and have been required to make extensive repairs. For the foregoing reasons, and the fact that power lines are many times located in remote areas, access to them for repair, maintenance and inspection may be very difficult, dangerous, and time-consuming. This is especially true in developing Third World countries.

In the power generating utility industry the repair, maintenance, and inspection of energized transmission lines and their attendant structures usually requires that the system be shut down or de-energized to prevent the possibility of a fault discharge to any repair equipment or personnel placed in the vicinity of the energized components. Numerous attempts have been made in the industry to permit repair of the adjacent structures while allowing the line to remain energized thereby reducing the loss of revenues. This would require the use of an ungrounded platform so that fault current discharge could not occur. Various types of ground equipment, such as boom trucks, have been utilized but have been less than adequate because of the potential for fault discharge, structural default resulting in a grounding condition or negligence of personnel resulting in fault current discharge from energized components to the grounded or semi-grounded vehicle causing injury, death and damage.

A generally accepted method of repair, maintenance and inspection is that known as "barehand." This procedure involves the maintenance man generally attaching himself to the energized transmission line, raising his potential to that of the energized component. This "barehand procedure" maintenance technique has been developed and utilized in the electrical industry within the last seven to ten years. The procedures involve placing a lineman, a conductor cart, and/or equipment on the energized conductors themselves while the high-voltage transmission line is still in service. This technique has been developed and is being utilized primarily because of the high inherent costs of shutting or de-energizing a line in order to perform maintenance on it. This procedure facilitates such maintenance items as changing out insulators, effecting splice repairs of the conductor cable itself, installing repair sleeves, and repairing damage to the covering of the conductor such as armor rodding and spacer repair or replacements in bundled conductors. The inherent dangers associated with barehanding is primarily in the transferring of men and equipment to the energized component, i.e., from a grounded state to an ungrounded state. Various techniques that are being used are transferring or working from an insulated bucket truck, extension of an insulated ladder from the grounded tower to the conductors thereby providing an insulated transferring point for a man to the conductor, or through the use of block and tackle in swinging men and equipment from a grounded position to an ungrounded state to the conductor. All of these techniques are time-consuming and have exhibited potentially dangerous characteristics, either through equipment failure or accident, because of the involved procedures or failure to follow procedures. It is the intent of this invention to preclude these techniques of transfer when conducting barehand operations through the time-efficient and simple method as explained herein. Additionally, the absence of complicated procedures in effecting this technique or process further provide enhanced safety prospects. It is recognized by this inventor that the industry's needs in systems reliability are becoming extensive in the use of barehand techniques. Through this invention a considerable increase in time efficiencies and safety is effected when utilizing an overhead approach from an ungrounded position in space and the utilization of insulated links which embraces the use of simplified procedures and equipment to effect placement of men and materials on energized components.

SUMMARY OF THE INVENTION

The present invention relates to a new and improved method and system of placing a load, which may consist of equipment, material, or personnel, on or in proximity to an energized transmission line system and attendant support structures. The method consists of suspending the load from an aerial, generally ungrounded support means in space, such as a helicopter or crane, which may be configured to provide a generally ungrounded platform through the use of insulated components to allow sustained contact by the load with an energized component. The system provides gaps in conductivity by the use of an ungrounded support means and the addition of a plurality of insulated means to support the load to insure that upon contact with any combination of energized components and grounded objects, no fault current discharge will occur. The system may be configured to accommodate various situations regarding the location of energized and grounded components. This ungrounded and insulated system provides a means for delivering, maneuvering, and positioning loads in the environment of energized components of transmission line systems capable of sustaining contact with the energized components without producing fault current discharge. Airborne platforms such as helicopters provide versatile support means which are highly maneuverable, reliable, safe and cost-effective in placing loads on or in proximity to energized transmission line systems. The use of insulated links and the ungrounded nature of the helicopter provides a degree of safety and versatility not available in the electrical utility industry.

The suspension means utilized in the instant invention may be configured to permit a load to be lowered between various levels of energized and grounded components without inducing fault current discharge upon contact with any combination of the energized and grounded components. The suspension apparatus provides a zone of compromise between the energized component and the platform. The presence of insulating components in the suspension apparatus increases the capability of the system to sustain contact with energized components.

The suspension means associated with this delivery system may be connected to a cargo hook, hoist, winch, or other suitable attachment point of the support platform and will normally consist of a suspension apparatus such as a rope or cable and include a retaining means such as a basket or seat device for connecting the load to the suspension apparatus. A limited slip means may be added consisting of an electric winch with an adjustable drag brake or a device such as the Sky Genie limited slip descent device. The limited slip means may be incorporated whenever the load being delivered, such as personnel, will be simultaneously tethered to the maneuvering support platform and any stationary component of the transmission line system. This limited slip means will allow for required extension in the length of the suspension apparatus due to inadvertent or intentional maneuvering of the aerial support platform, such as movement of the helicopter during hovering due to wind conditions. As a result of the load suspended from the helicopter being temporarily connected to the energized object, the helicopter is thus simultaneously tethered to a stationary object and some flexibility may be provided in the suspension apparatus to allow the helicopter flight control movements. As an additional embodiment, the suspension apparatus may be provided with insulated links, commonly referred to as hot sticks, generally of fiberglass material, such as those manufactured by A. B. Chance or similar companies. The length and size of the hot sticks will be determined by the physical load requirements and the voltage to which the system may be exposed. These insulated hot sticks are test rated at time of manufacture generally to a rating of not less than 100,000 kv per foot for five minutes. The insulated link, whenever connected to an energized conductor, should have a leakage rate not to exceed one micro-amp per kv, normal phase to ground, up to three minutes with no voltage flux as indicated in ANSI Standard A92.2, 1979. Attached to the end of the suspension apparatus may be attached a means for attachment of the load, such as a man outfitted in a bosun's seat. The lineman may also be outfitted in accordance with standard lineman procedures for working on energized conductors utilized the technique known as "barehand" in a conductive suit (hot suit) and further utilizing a retaining means such as a body harness (swiss seat). Incorporated in the harness would be necessary attaching devices, either snap hooks or pulleys that can be attached to the suspension apparatus or the structure, as necessary, to provide a transfer from the suspended insulated apparatus of the helicopter to the object or energized transmission line. The method provides for landing of a man on the conductor or grounded component of an energized transmission system from an ungrounded aerial platform and utilization of the hot sticks allows for inadvertent contact between grounded and energized objects by the suspension system or helicopter. As a result, while in contact with an energized component such as a conductor, either the helicopter or the suspension apparatus may inadvertently make physical contact with a grounded component of the transmission line system such as the tower, overhead ground wire or other phase lines. Safe operating conditions are maintained by virtue of the fact that the insulated link provides an insulated gap in the system so as to prevent fault discharge and prevent injury or damage to any components of the system. The insulated link may also be made of any material or object, whether it be transmission line insulators, fiberglass sticks or synthetic line, that has sufficient dialectric strength to be used as such.

Procedures further provide that the maintenance man wear a conductor suit (hot suit) on top of all of his underclothing in accordance with utility industry standards. Certain tie strings on the conductor shirt are utilized for connection between the conductor suit and tools or other objects which may be of varying potential. The hood of the conductor suit may be worn on top of the flight helmet. In this manner the maintenance man is totally enveloped within the conductive suit. A seat means such as a bosun's chair may be provided to attach and retain the man to the suspension means.

The procedure for placing the load, or the man, on the energized transmission line or component involves suspending him from an aerial platform such as a helicopter utilizing suspension rigging described above. An overhead support means being a functional equivalent of the rotary wing aircraft may be utilized to provide the support and maneuver for the load. A section of the suspension rigging of a crane or similar device may be isolated by use of insulated material or components to provide an ungrounded overhead support means capable of lifting and maneuvering the load while maintaining the suspending section of the rigging in an ungrounded condition to prevent fault current discharge. This may be accomplished by placing an insulated section or link between the load and the portion of the crane which is in contact with the ground. The helicoptor picks up the load from the ground and can rapidly transport it to the vicinity of the transmission line system slung beneath the helicopter. In immediate proximity to the transmission line system, the helicopter will hover to make support of the load and place it in the desired position. In the case of transferring a man onto an energized component, the helicopter will place the man adjacent to the component thereby allowing him to grasp the component. In grasping an energized component, the man may utilize a device to grasp the component and absorb the voltage discharge between two differing ungrounded potentials, the man, and the helicopter and suspension system. When the man makes contact with the energized component, he raises the potential of his body and clothing to that of the component. If there are no insulation links in the suspension line, the entire system, to include the helicopter, will be raised to the new potential. An insulation link will isolate the raised potential to those parts of the emplacement system between the insulated links and the energized component. These energized portions of the emplacement system must avoid contact with a grounded potential to avoid a fault current discharge. In order to avoid such contact, the helicopter maintains distance from any grounded components such as the overhead ground wire. Also, additional insulated links are utilized to isolate the energized portions of the emplacement system. In order to safely transfer the man to the component, a line is attached from him to the transmission line component thereby momentarily tethering the helicopter to the component. Immediately, the man detaches himself from the helicopter to be supported by the component. Removal of the man is accomplished in reverse. Due to the maneuverability and simplicity of the procedure, a man can be rapidly transferred between transmission line components and the helicopter. For the brief period when the helicopter is tethered to the object, in addition to the limited slip device which only provides for slippage upon exertion of a steady force, a common break-away link is provided in the retaining means. In attaching the man to the energized object, the break-away link will withstand instantaneous dynamic force of up to an amount such as 900 pounds before rupturing to allow an emergency disconnection between the man and the helicopter or between the helicopter and tethered object, depending on the placement of the break-away link. A swiss seat is attached to the man independent of the bosun's chair to allow for emergency backup body harness in the event of any failure in the bosun's chair and to provide for an emergency descent from any transmission line component. An emergency descent means consisting of a rope and attachment device is provided to the man so that if he is stranded on a structure he can lower himself to the ground.

In an alternative embodiment of this instant invention, the aerial platform used to lift, transport, and maneuver equipment and material in position onto or in proximity to energized components of the transmission line system is a common crane or other similar device. In this mode the suspension apparatus must use isolated links to suspend and electrically isolate the load below the aerial platform. Insulation links are utilized as previously described to protect the load and platform from inadvertent fault discharge. Limited slippage devices and break-away links are generally unnecessary unless the crane will be simultaneously tethered to the object and will need to maneuver.

In the most simple embodiment, the ungrounded platform, such as the helicopter, supports a load on a suspension apparatus which does not have any insulating capability. This embodiment relies solely on the platform being ungrounded to avoid fault current discharge.

It is an object of this invention to provide a system for safely placing a load in contact with an energized component of a transmission line system.

It is another object of this invention to provide a method for safely placing a load in contact with an energized component of a transmission line system.

It is yet another object of this invention to provide an ungrounded platform for safely suspending a load in proximity to an energized component of a transmission line system.

It is still another object of this invention to provide a system for isolating energized portions of this invention to prevent fault current discharge.

It is yet still another object of this invention to provide a system for rapidly and cost-effectively placing loads in proximity to energized components of transmission line systems.

In accordance with these and other objects which will be apparaent hereinafter, the instant invention will now be described with particular reference to the accompanying drawings.

BRIEF DESCRIPTION OF THE DRAWINGS

FIG. 1 shows a perspective view of the instant invention.

FIG. 2 shows a perspective view of a retaining means for a human load.

FIG. 3 shows a perspective view of a human load attached to an energized transmission line.

DESCRIPTION OF THE PREFERRED EMBODIMENT

Figure 4:
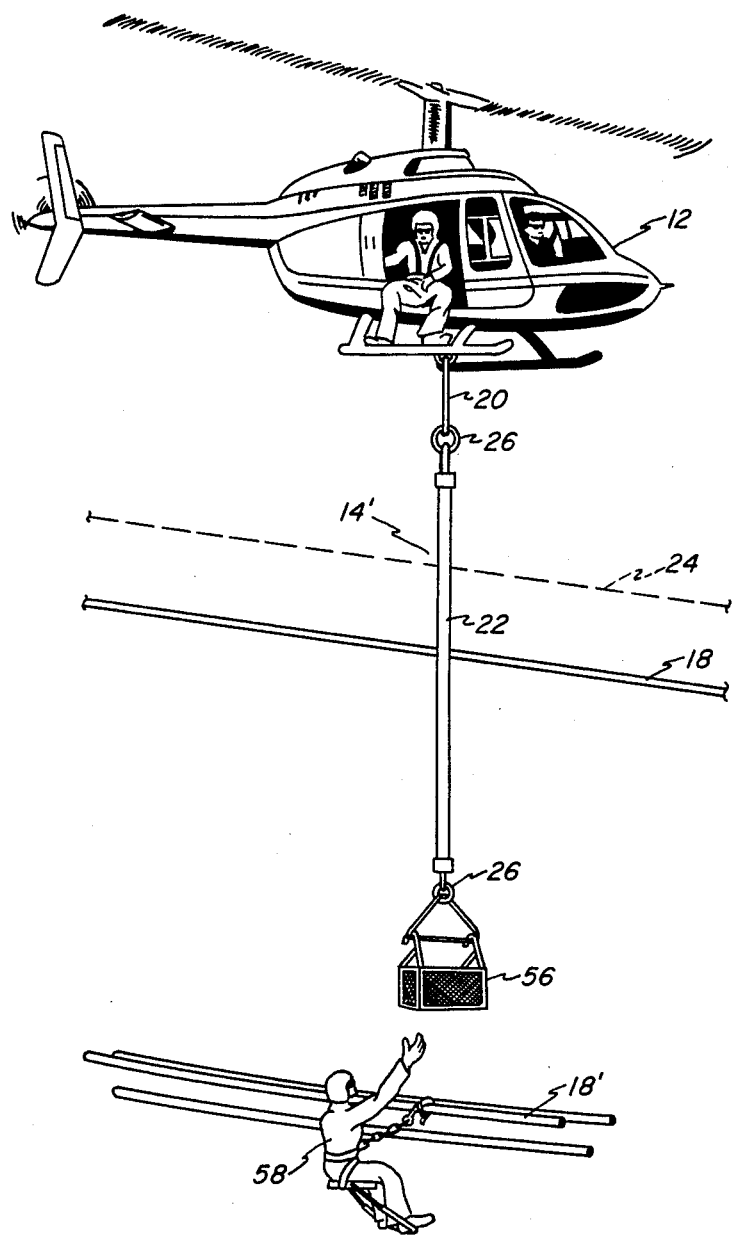
FIG. 4 shows a perspective view of the instant invention.

Referring now in detail to the drawings and in particular to FIG. 1, there is shown a perspective view of the preferred embodiment of the system for placing a load on or adjacent to components of a transmission line system, generally designated as numeral 10. The aerial support platform 12, preferably a rotary wing aircraft such as a helicopter, provides support for a suspension apparatus 14 to suspend the load 16, such as a man, equipment or material. The platform 12 lifts, transports and maneuvers to position the load 16 adjacent to a component of a transmission line system, such as a conductor 18. Apparatus 14 may consist of a suspension line 20 of rope or cable attached to the platform 12 by the helicopter cargo hook or other similar attachment device. In those situations when an insulated link 22 is desired it may be positioned between either the platform 12 and the suspension line 20 or between suspension line 14 and load 16 (as shown in FIG. 1). Additional insulated link 22 may be added and configured to provide necessary and desired gaps in the system to isolate energized portions of the system and prevent fault discharge in response to various configurations of the energized components and grounded components of the voltage transmission line system. As shown in FIG. 1, the insulated link 22 provides a barrier to fault discharge to platform 12 even if platform 12 was in contact with a grounded object and load 16 was in contact with an energized component such as conductor 18, or vice versa. Although as long as platform 12 remained ungrounded fault discharge would not occur the insulated link 22 provides an additional margin of safety in the event platform 12 contacts a grounded object. A typical situation requiring an insulated link 22 is provided when the load must be lowered below or in the vicinity of a grounded object such as overhead ground wire 24 or other phase. Since each phase is considered a ground to each other phase, a fault current would flow between conductor phase bundles unless isolated by an insulated link 22. Other insulating components may be utilized in suspension apparatus 14 to connect various portions and provide additional insulation and isolation. A limited slip device 28, such as a Sky Genie, may be connected to the cargo hook (not shown) of platform 12 to provide for extension of suspension apparatus 14 upon steady, upward force by the platform 12 when load 16 is simultaneously attached to conductor 18 and apparatus 14. Upon such upward force, additional line 30 is displaced through device 28 to increase the length of apparatus 14 and allow manuever of platform 12 to maintain flight control. Strap 32 supports bag 34 which holds additional line 30.

As shown in FIGS. 1, 2 and 3, load 16 may be retained at the end of apparatus 14 by a combination of swiss seat 36, bosun's chair 38, support chain 40, and safety chain 42. Load 16, a man, is provided a common swiss seat 36 which attachs directly to his body to provide him personal, direct attachment to platform 12 through bosun's chair harness. The bosun chair 38 and swiss seat 36 are connected together and secured to the body of the man by the connection of two common D-rings 37 from the bosun's chair 38 and a snap link 48 from the swiss seat. Chain 40 and safety chain 42 are also connected to the D-rings 37. Attached to the distal end of support chain 40 and safety chain 42 are snap hooks 50 and 52, respectively. Snap hook 52 attached to safety chain 42 connects with clevis 44 attached to safety line 46 to provide a safety connection with platform 12. Snap hook 50 is connected to apparatus 14 to support load 16. When the man (load 16) is positioned adjacent to conductor 18, he unhooks snap hook 52 and attaches it to conductor 18 to provide a momentary tethering connection between platform 12 and conductor 18. Upon this connection, the potential between the man (load 16) and the conductor 18 is equalized. Since platform 12 is ungrounded or link 22 isolates the load 16 from a ground potential such as overhead ground wire 24, there is no fault current discharge. The man is lowered to allow safety chain 42 to support his weight and release tension on apparatus 14 so that snap hook 50 may be unhooked from donut 26 and attached to conductor 18 to equally support the weight of the man on the bosun's chair 38, as shown in FIG. 3.

A break-away link 54 is provided in either support chain 40 or safety chain 42 to sever the chain between its respective snap hook and D-ring. This break-away link is provided as a safety measure for that occassion when a generally upward force is exerted upon the load 16 while tethered to both conductor 18 and platform 12, as shown in FIG. 1. While slip device 28 will provide extension of apparatus 14 upon steady force, a sharp, instantaneous force of a pre-determined amount will rupture break-away link 54 with the result that load 16 will remain either with apparatus 14 (break-away link in chain 42 as shown in FIG. 1) or with conductor 18 (break-away link in chain 40).

Pick-up of the load (man) would be performed in reverse order by first unhooking snap hook 52 from conductor 18 and attaching it to clevis 44 so that the man cannot be inadvertently released during pick-up, then unhooking snap hook 50 and attaching it to donut 26. The bosun's chair 38 may be provided with a foot rest 56.

Snap hooks 52 and 50 (as shown in FIG. 3) or pulleys (not shown) allow the man to move laterally along conductor 18 to perform maintenance, make inspections or other operations. By utilizing an additional length of non-conductive line (not shown) carried on his person, the man suspended from conductor 18 could perform a descent to the ground by unhooking one clevis from D-ring 37 and attaching one end of the line to it and attaching the remainder of the line to the swiss seat and rappelling from the line to the ground.

In an alternative embodiment, as shown in FIG. 4, the delivery system is utilized to provide a load 56 (basket) suspended by apparatus 14' to the maintenance personnel 58 operating on conductor 18'. Personnel 58 is suspended from conductor 18', as shown in FIG. 3. Platform 12 is used to lift, transport and maneuver load 56 into position for personnel 58. Since load 56 will generally not be tethered to conductor 18', the slip device 28 and break-away link 54 are not necessary although they should be used if loads of personnel (load 16) and equipment and material (load 56) are to be alternately positioned by platform 12 along the voltage transmission line system, or if platform 12 will be momentarily tethered to conductor 18' or any other structural component.

Line 20 is attached to the cargo hook (not shown) of platform 12. Insulated link 22 is attached to line 20 to provide an insulated gap if required by the presence of overhead ground wire 24 or other energized or grounded object as previously described.

In FIGS. 1 and 4 the man (load 16 or personnel 58) may utilize a conductive stick (not shown) to grasp the conductor 18 or load 56 to assist in equalizing the potential between the man and the conductor 18' or load 56 and for maneuvering and positioning the load.

Figure 5:
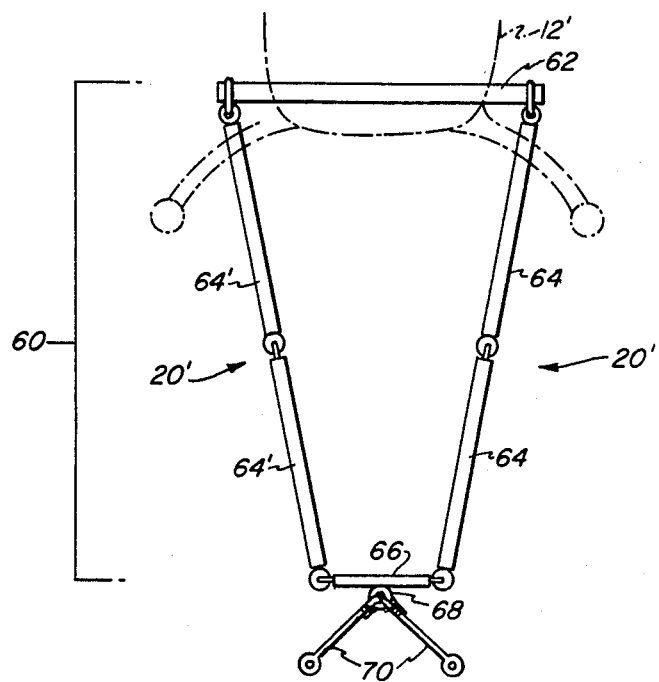
FIG. 5 shows a front elevation view of an alternative embodiment of the suspension means.

FIG. 5 shows an alternative embodiment for the suspension means. Suspension apparatus 60 attaches to platform 12' by extending through the interior of the helicopter 12'. Cross member 62 rests on the floor of the helicopter 12'. A plurality of insulated links 64 and 64' connect to provide an insulated suspension line 20'. Cross member 66 joins the two suspension line 20' to provide a suspension apparatus 60. Connecting donut 68 provides a connecting point for other non-insulated suspension lines 70 for a load (not shown). Apparatus 60 provides simple, balanced connection with helicopter 12'. By connecting the apparatus 60 through the interior of helicopter 12', one of the most secure connections with platform 12' is provided.

In an alternative embodiment, a crane (not shown) may be utilized as the aerial support platform. An ungrounded condition of the crane may be achieved by insulating portions of the crane itself or utilizing insulated links in the suspension apparatus to isolate the crane from energized components of the transmission line system, or from parts of the suspension apparatus which are energized by contact with an energized component of the transmission line system.

I claim:

1. An airmobile transfer system for sequentially transferring a load between an ungrounded overhead platform and elevated components of an energized transmission line system, comprising:

a support means for providing temporary overhead, ungrounded maneuverable lift to support the load during transfer between the transmission line system and said support means;

a placement means connectable to said support means for transferring the load between a component of the energized transmission line and said support means by temporary tethering said support means to said transmission line;

said placement means and said support means capable of maintaining an ungrounded condition while in contact with an energized component of the transmission line system and while being raised to the potential of the energized component;

said placement means includes a suspension means connectable to said support means for suspending the load beneath said support means and adjacent the transmission line system during transfer of the load between said support means and the component of the energized transmission line system;

said suspension means connectable termporarily to both the component and said support means during transfer;

said support means includes a rotary wing aircraft such as a helicopter;

said suspension means includes a transfer means, said transfer means includes a load retaining means connectable to said transfer means at a common point for isolating the load from any force placed on said transfer means while connected to both said support means and the component, said transfer means temporarily connectable to said suspension means and to a component of the transmission line system for rapidly transferring the load between said suspension means to the transmission line component by sequentially connecting the load to both the component and said support means and then disconnecting said load retaining means from the component or the suspension means, said transfer means capable of supporting the load from the transmission line component, said transfer means capable of supporting the load from said suspension means;

said transfer means includes a break-away means for providing a separation of the connection between said support means and the transmission line component upon generally abrupt exertion of a predetermined dynamic force by said support means while simultaneously tethered to the transmission line component by said transfer means during transfer of a load between said suspension means and the transmission line component, said break-away means connected between said suspension means and the component, placement of said break-away means in said suspension means determines whether the individual remains tethered to said suspension means or the transmission line component upon separation.

2. A system as set forth in claim 1, wherein:

said suspension means includes a limited slip means for providing continuous lift to the load and maneuverability to said support means by extending the length of said suspension means upon generally non-abrupt, steady force exerted upward by said support means during random upward movement while tethered to the transmission line component by the suspension means during transfer of a load between said suspension means and the transmission line component thereby permitting said support means to maneuver and maintain flight control.

3. A system as set forth in claim 2, wherein:
said suspension means includes an insulation means connected to said suspension means for providing insulation to isolate portions of said system to minimize fault current discharge between any portions of said system upon contact by the system with an energized component and a grounded object thereby preventing injury to personnel and damage to said system and the transmission line system.

4. A system as set forth in claim 3, wherein:
said transfer means includes a body retaining means connectable to said transfer means for disconnecting a load consisting of one or more individuals from said transfer means while connected to the transmission line component to permit descent to the ground;
said body retaining means includes a means for the individual to lower himself to the ground from the component.

5. A system as set forth in claim 4, further including:
a safety lift means attached to said support means for connectable attachment with said transfer means independent of said suspension means suspended beneath said support means for providing independent lift to the load when the transfer means is disconnected from the suspension means and the component during the transfer of the load, said safety means sequentially connected or disconnected to said transfer means.

6. A system as set forth in claim 5, wherein:
said support means includes a rotary wing aircraft such as a helicopter.

7. A system as set forth in claim 5, wherein:
said support means includes a crane means for providing continuous maneuverable overhead support to the suspension means during transfer between said support means and the component of the transmission line system, said crane means having an insulating means for maintaining an ungrounded condition while in contact with an energized component of the transmission line system while being raised to the potential of the energized component to prevent fault current discharge within said system.

8. A system as set forth in claim 6, wherein:
said suspension means includes a suspension framework comprising a generally horizontal cross-member connected to said helicopter extending through an opening in the interior of said helicopter supported by a floor of the helicopter generally perpendicular to a longitudinal axis of said helicopter and one or more opposed generally vertical support members connected to each opposed end of said cross-member, said two opposed ends extending from said helicopter, said vertical support members including a plurality of insulated members connected to each end of said cross-member, said support members extending beneath said helicopter, said opposed support members connected together beneath said helicopter, and said support members having sufficient strength to support a load connected to said suspension framework beneath said helicopter.

9. A method using a means adapted for depositing a load on a high tension electrical wire above the ground, said wire being energized substantially above ground potential, said wire carrying a substantial electric current, said current giving rise to an electric field about said wire, and wherein said means comprises:
means effective for lifting said load above said wire; and means for attaching said load to said wire; said method comprising:
a step for causing said means effective for lifting to lose physical contact w:th said ground, said step for causing being effecitve to electrically isolate said means effective for lifting from said ground potential;
a step for using said means effective for lifting to lift said load to said wire, said step for using being effective to cause said load to be at the same electrical potential as that of said electric field at said wire;
a step for using said means for attaching to mechanically attach said load to said wire;
a step for withdrawing said lifting means from said load in a manner effective to leave said wire as the sole support for said load.

10. The method of claim 9, wherein said means effective for lifting comprises a helicopter and a grappling line extending between and attached to said helicopter and said load, said grappling line comprising at least one portion of electrically insulating material, wherein said method comprises attaching said grappling line between said helicopter and said load.

11. The method of claim 10, wherein said means for attaching comprises a plurality of surfaces adapted to locate about said wire and being effective to support said load on said wire, wherein said method comprises:
fastening said plurality of surfaces on said wire;
detaching said grappling line from said load.

12. The method of claim 11, wherein said plurality of surfaces comprise one or more hooks.

13. A method using a means adapted for depositing a load on a high tension electrical wire above the ground, said means comprising:
means effective for lifting said load above said wire; and means for attaching said load to said wire, said means for attaching comprising breakaway means for attaching said load to said wire; said method comprising the steps for:
causing said means effective for lifting to lose physical contact with said ground;
using said means effective for lifting to lift said load to said wire;
using said means for attaching to mechanically attach said load to said wire;
withdrawing said lifting means from said load in a manner effective to leave said wire as the sole support for said load.

14. The method of claim 13, wherein said means effective for lifting comprises a helicopter and a grappling line extending between and attached to said helicopter and said load, said grappling line comprising at least one portion of electrically insulating material, wherein said method comprises attaching said grappling line between said helicopter and said load.

15. The method of claim 14, wherein said means for attaching comprises a plurality of surfaces adapted to locate about said wire and being effective to support said load on said wire, wherein said method comprises:
fastening said plurality of surfaces on said wire;
detaching said grappling line from said load.

16. The method of claim 15, wherein said plurality of surfaces comprises one or more hooks.

17. A method using a means adapted for depositing a load on a high tension electrical wire above the ground, said wire being energized substantially above ground potential, said wire carrying a substantial electric current, said current giving rise to an electric field about said wire, comprising:

means effective for lifting said load above said wire; and means for attaching said load to said wire; said means for lifting and said load being in direct electrical contact with said wire; said method comprising:

a step for causing said means effective for lifting to lose physical contact with said ground, said step for causing being effective to electrically isolate said means effective for lifting from said ground potential;

a step for using said means effective for lifting to lift said load to said wire, said step for using being effective to cause said load to be at the same electrical potential as that of said electric field at said wire; and a step for using said means for attaching to mechanically and electrically attach said load to said wire; said means effective for lifting and said load being energized to substantially the same electrical potential as said wire.

18. The method of claim 17 further comprising:

a step for withdrawing said lifting means from said load in a manner effective to leave said wire as the sole support for said load.

* * * * *